United States Patent [19]

Baule

[11] Patent Number: 5,249,262
[45] Date of Patent: Sep. 28, 1993

[54] COMPONENT INTERSECTION DATA BASE FILTER

[75] Inventor: Gerhard M. Baule, Camillus, N.Y.

[73] Assignee: Intelligent Query Engines, Syracuse, N.Y.

[21] Appl. No.: 695,137

[22] Filed: May 3, 1991

[51] Int. Cl.$^5$ .............................................. G06F 15/00
[52] U.S. Cl. ........................................ 395/66; 395/54; 395/600
[58] Field of Search ........................... 395/66, 2, 600

[56] References Cited

U.S. PATENT DOCUMENTS 3,964,029 6/1976 Babb .
4,593,403 6/1986 Kishi et al. ............................ 395/2

OTHER PUBLICATIONS

Ceri et al., "What You Always Wanted to Know About Datalog (And Never Dared to Ask)", IEEE Transactions on Knowledge and Data Engineering, vol. 1, No. 1 Mar. 1989, pp. 146-165.
Turbo Prolog 2.0 User's Guide, IBM Version, Borland, 1988, pp. 46-51, 58-60, 62-64, 99-109, 146-147, 167, 214-215, 219, 248-252, 266, 271, 274-275, 320-326, 358-361.
Yokota et al., "Term Indexing for Retrieval by Unification," Proceedings Fifth International Conference on Data Engineering, 1989, pp. 313-320.
E. Babb, "CAFS File-Correlation Unit," ICL Technical Journal, Nov. 1985, pp. 489-503.
E. Babb, "Implementing a Relational Database by Means of Specialized Hardware," ACM Transactions on Database Systems, vol. 4, No. 1, Mar. 1979, pp. 1-29.
Donald E. Knuth, "The Art of Computer Programming, vol. 3, Sorting and Searching," Addison-Wesley Publishing Company, Inc., 1973, pp. 558-563.
P. Bruce Bera, Soon Myoung Chung, and Nabil I. Hachem, "Computer Architecture for a Surrogate File to a Very large Data/Knowledge Base," Computer, vol. 20, No. 3, mar. 1987, pp. 25-32.
David H. D. Warren, "An Abstract Prolog Instruction Set," SRI International, Oct. 1983.
John Gabriel, Tim Lindholm, E. L. Lusk, R. A. Overbeek, "A Tutorial on the Warren Abstract Machine for Computational Logic," Argonne National Laboratory, Jun. 1985.

Primary Examiner—Allen R. MacDonald
Attorney, Agent, or Firm—Robert J. Koch; Mark Ungerman

[57] ABSTRACT

A Component Intersection Database Filter is a mechanism to process conjunction-of-constraints queries which does not require indexes, allows arbitrary query complexity without exponential explosion in query processing time, and is inexpensive to implement. For a wide variety of queries, this Component Intersection Database Filter Engine drastically reduces the amount of processing required to determine the final answers. For certain queries it can eliminate all incorrect answers, thus requiring no further processing. It is of linear complexity. High speed filtering can be done with simple hardware or software. Further, the processing can be combined with conventional selection filtering and both performed in a pipelined fashion as data streams off disc. The processing is accomplished by building a filter by intersecting predicate instantiations of corresponding unknown components and then filtering potential solution facts by eliminating those with terms corresponding to unknowns not within the intersection.

26 Claims, 8 Drawing Sheets

Q      (ALL (abcd) (MK1fbcK2aK3d)
                   (NeK4dce)
                   (Pca)                QUERY
                   (RK5K6d)
                   (ScK7e)

FIG.2a

```
     a  b  c  d  e  f  K1 K2 K3 K4 K5 K6 K7
M    *  *  *  *     *  *  *  *
N          *  *  *           *
P    *     *
R             *                    *  *
S          *     *                        *
```
QUERY PATTERN

FIG.2b

```
      a  b  c  d  e
MM    *  *  *  *  *
NN    *  *  *  *  *
PP    *  *  *  *  *
RR    *  *  *  *  *
SS    *  *  *  *  *
```
UI PATTERN

FIG.2c

ORIGINAL PARENT PREDICATE FACTS

| | |
|---|---|
| (PARENT JOHN | JOHN Jr.) |
| (PARENT JOHN Jr. | JOHN III) |
| (PARENT TED | JOHN) |
| (PARENT SUE | JOHN) |
| (PARENT MARY | JOHN Jr.) |
| (PARENT JOHN Jr. | KAREN) |
| (PARENT MARK | DAVE) |
| (PARENT MICHELLE | JIM) |
| (PARENT KATHY | SHAWN) |

FIG.3a

ORIGINAL OWES PREDICATE FACTS

| | | |
|---|---|---|
| (OWES JOHN III | MARY | 10000) |
| (OWES MARK | MICHELLE | 2000) |
| (OWES KAREN | JOHN | 900) |

FIG.3b

THE QUERY (Q2) (ALL (w x y) (PARENT w z)
                    (PARENT z x)
                    (OWES x w y)
                    (z y 1000)

FIG.3c

FACTBASES AFTER NON-CI FILTERING

| | | | | |
|---|---|---|---|---|
| (PARENT1 JOHN | JOHN Jr.) | (PARENT2 JOHN | JOHN Jr.) | (OWES JOHN III 10000) |
| (PARENT1 JOHN Jr. | JOHN III) | (PARENT2 JOHN Jr. | JOHN III) | (OWES MARK 2000) |
| (PARENT1 TED | JOHN) | (PARENT2 TED | JOHN) | |
| (PARENT1 SUE | JOHN) | (PARENT2 SUE | JOHN) | |
| (PARENT1 MARY | JOHN Jr.) | (PARENT2 MARY | JOHN Jr.) | |
| (PARENT1 JOHN Jr. | KAREN) | (PARENT2 JOHN Jr. | KAREN) | |
| (PARENT1 MARK | DAVE) | (PARENT2 MARK | DAVE) | |
| (PARENT1 MICHELLE | JIM) | (PARENT2 MICHELLE | JIM) | MARY |
| (PARENT1 KATHY | SHAWN) | (PARENT2 KATHY | SHAWN) | MICHELLE |

FIG.3d

OPERATION I—SEQUENCE OF UNKNOWNS (w x y z)

FIG.3e

OPERATIONS 2 THROUGH 4 - FORM PREDICATE SATISFACTION SEQUENCES AND COMPONENT SETS

PARENT1 SATISFACTION SEQUENCES

| | w | x | y | z |
|---|---|---|---|---|
| (PARENT1 | JOHN | * | * | JOHN Jr.) |
| (PARENT1 | JOHN Jr. | * | * | JOHN III) |
| (PARENT1 | TED | * | * | JOHN) |
| (PARENT1 | SUE | * | * | JOHN) |
| (PARENT1 | MARY | * | * | JOHN Jr.) |
| (PARENT1 | JOHN Jr. | * | * | KAREN) |
| (PARENT1 | MARK | * | * | DAVE) |
| (PARENT1 | MICHELLE | * | * | JIM) |
| (PARENT1 | KATHY | * | * | SHAWN) |

PARENT2 SATISFACTION SEQUENCES

| | w | x | y | z |
|---|---|---|---|---|
| (PARENT2 | * | JOHN Jr. | * | JOHN) |
| (PARENT2 | * | JOHN III | * | JOHN Jr.) |
| (PARENT2 | * | JOHN | * | TED) |
| (PARENT2 | * | JOHN | * | SUE) |
| (PARENT2 | * | JOHN Jr. | * | MARY) |
| (PARENT2 | * | KAREN | * | JOHN Jr.) |
| (PARENT2 | * | DAVE | * | MARK) |
| (PARENT2 | * | JIM | * | MICHELLE) |
| (PARENT2 | * | SHAWN | * | KATHY) |

OWES SATISFACTION SEQUENCES

| | w | x | y | z |
|---|---|---|---|---|
| (OWES | MARY | JOHN III | 10000 | *) |
| (OWES | MICHELLE | MARK | 2000 | *) |

PARENT1 COMPONENT SETS

| PARENT1w | PARENT1x | PARENT1y | PARENT1z |
|---|---|---|---|
| JOHN<br>JOHN Jr.<br>TED<br>SUE<br>MARY<br>MARK<br>MICHELLE<br>KATHY | [*] | [*] | JOHN Jr.<br>JOHN III<br>JOHN<br>KAREN<br>DAVE<br>JIM<br>SHAWN |

PARENT2 COMPONENT SETS

| PARENT2w | PARENT2x | PARENT2y | PARENT2x |
|---|---|---|---|
| [*] | JOHN Jr.<br>JOHN III<br>JOHN<br>KAREN<br>DAVE<br>JIM<br>SHAWN | [*] | JOHN<br>JOHN Jr.<br>TED<br>SUE<br>MARY<br>MARK<br>MICHELLE<br>KATHY |

OWES COMPONENT SETS

| OWESw | OWESx | OWESy | OWESx |
|---|---|---|---|
| MARY<br>MICHELLE | JOHN III<br>MARK | 10000<br>2000 | [*] |

FIG. 3f

OPERATION 5-FORM CI SETS

| CIw | CIx | CIy | CIz |
|---|---|---|---|
| [MARY, MICHELLE] | [JOHN III] | [10000, 2000] | [JOHN Jr., JOHN] |

FIG.3g

OPERATIONS 6 AND 7-FILTER PREDICATE SATISFACTION SEQUENCES THROUGH CI SETS (PARENT1  MARY      *          *      JOHN Jr.)
(PARENT2  *         JOHN III   *      JOHN Jr.)
(OWES     MARY      JOHN III   10000  *        )

FIG.3h

COMPONENT INTERSECTION DATA BASE FILTER

BACKGROUND OF THE INVENTION

1. Field of the Invention

The present invention generally relates to the field of Logic Programming and Database Processing Engines and, more particularly, to the processing of complex conjunction-of-constraint queries when large factbases are involved.

As the amount of data that computers can store and generate has increased, the need to perform complex flexible queries has become vitally important. Large databases by the very nature of their size are limited in their usefulness unless there is some way to home in on the required data. Flexible queries can hone the results produced to what is necessary for a specific purpose, thereby increasing the value of the underlying data. Moreover, flexible queries can be utilized to bring together information from various separate database files to produce new information. These flexible queries can be expressed by defining the data and the constraints to which this data must adhere in the form of a conjunction of constraints. This conjunction of constraints and data it queries can be written in many different manners of which the most general comes from the field of Logic Programming.

2. Description of the Related Technology

The basic approach in Logic Programming is to describe a given domain of knowledge through the assertion of facts and rules. The asserted facts and rules can be queried, whereupon a logic engine deduces each answer that can be proven from the facts and rules asserted. The user may request any number of answers from one to all possible answers. The result of the query is new information based on the facts, rules and the specific query. This is in contrast to conventional approaches where "data" is processed via preformulated and programmed algorithms. The focus of the invention is on querying facts. Therefore, further discussion will concentrate on queries not involving rules. The inclusion of rules, which are generally of a limited number, can be handled through other methods in combination with the invention.

In order to better describe the invention, the following terms are described at the outset:

Predications—A logic program's facts and queries are built from simple sentences called predications. A predication is made up of a predicate followed by a subject having n terms. At minimum, a given term can be an individual constant or an unknown (also called a variable). The form of a predication is (OWES x Mary 1000) (P1)

In predication (P1), the predicate OWES has a 3-tuple subject, whose first term is an unknown, named x, whose second term is the individual constant Mary, and whose third term is the constant 1000. In this case the predication (P1) is read "Someone owes Mary 1000 dollars."

A predication that contains one or more unknowns is open; otherwise it is closed. An open predication is closed by instantiating each of its unknowns with an individual constant. Only closed predications can be logically evaluated to True or False.

Facts—Facts are predications that contain no unknowns. i.e. they are closed predications Facts are made up of a predicate followed by n individual constants, where n is the arity. For example, the fact (F1), with arity 2, states that John is the parent of Mary.

(PARENT John Mary) (F1)

Queries—Queries are formulated by specifying a desired answer template of unknowns and a conjunction of constraints. A Conjunction of constraints, or more simply a conjunction, is composed of one or more predications which constrain the possible values of the answer template. The skeleton of a Query is presented below:

(ALL (x y ... n) A&B&C)

where A, B, C are open predications, that contain the unknowns x, y, ..., n and possibly other unknowns This query is read: return all sets of values for (x y ... n) which cause A to be true, B to be true, and C to be true. The ALL requests the machine to find all query answers that can be deduced from the asserted facts. It is also possible to specify only the first answer(s) found. The predicate of every predication in the constraints is assumed to be the predicate of some set of asserted facts.

The unknowns in a query act as place holders for individual constants. Each unknown is designated by some name (here beginning with a lower case letter). The names themselves play no role, other than when the same name is used more than once within the constraints of a query, it indicates that, in each instance these places are to be instantiated with the same individual constant, i.e., to instantiate an unknown is to replace each and every occurrence of that unknown in a given query with the same individual constant. Different unknowns may be instantiated with different (or, for that matter, the same) constants.

As an example:

| (Q2) (ALL (w x y) | (PARENT w z) |
| | (PARENT z x) |
| | (OWES x w y) |
| | ($\geq$ y 1000)) |

The query (Q2) seeks to find all grandchildren, "x," who owe their grandparent, "w," a sum, "y," greater than or equal to 1000 dollars. It can be read, "Find all values (w x y) such that there exists some z where w is a PARENT of z, z is a PARENT of x, x OWES w y dollars, and y is greater than or equal to 1000." The query has four constraints, two with predicate PARENT, one with predicate OWES, and one with the predicate $\geq$.

The ability to assert specific facts and pose flexible (and previously unanticipated) queries is very useful. The Logic Programming field, and to a lesser degree Relational Database Processing, have attempted to achieve this. Logic programming uses conjunction of constraints to express both direct queries on the asserted facts, as well as in rules which allow a hierarchy of queries. Most Logic Programming implementations are based on an approach called the Warren Abstract Machine (WAM) which was described by D. H. D. Warren Relational Database languages have constructs which can express a conjunction which are carried out via a combination of multiple joins, selections, projections, and intersection operations. The solution of a conjunction-of-constraints query in relational database languages relies most heavily on, and is limited by, the processing of multiple joins. Prior art given below is drawn from these two areas: the WAM and database join techniques.

Warren teaches that conjunction-of-constraint queries may be processed through the use of "unification" (pattern matching) and "backtracking" search strategies of an AND-OR tree. The Warren method can be used to solve any conjunction of constraints, including one with rules, but the time required to do so can be prohibitively high. In the worst case, the time required to process a query grows exponentially with the number of the constraint predicates. The exact nature of this growth is quite complicated since the degree of the exponential explosion depends on both the query and predicate facts stored. This growth increases with the size of the fact files and the percentage of facts which pass the constraints.

It has also been proposed that indexes on the terms in a fact be used to both increase Relational database query processing speeds and improve the WAMs efficiency. Indexing is a technique frequently used to speed processing. An index is an auxiliary table that pairs key values with unique fact identifiers. The index provides direct rapid access to individual facts of a predicate. The shortcoming of this technique is that in order to provide rapid processing of arbitrary queries, all terms of a predicate would require an index. This would require excessive storage and would increase the time to add to or modify facts.

Knuth teaches that a Superimposed Code Word technique(SCW) be used to aid query processing. SCW is a special index which is formed by hashing each term of each fact predicate to produce a fixed length binary code word. The binary code words of the terms of a fact are then Ored together to create the SCW for the fact which, again with the fact's unique identifier, forms the index table entry. This SCW index can aid query processing. The SCW index also requires excessive storage and increased time to add or modify facts. However, more importantly, the effectiveness of SCW decreases, producing excessive false drops, if flexible queries are to be allowed since every term permitted in the queries must be used to form the SCW. The false drop problem requires that answers be verified in the actual database. This causes rapid degradation of performance as the number of potential answers grows.

Berra teaches that a Concatenated Code Word technique (CCW) be used to aid query processing. CCW is similar to SCW except the binary code word of each term now varies in length depending on the redundancy of the term. These varying length binary code words for each term in a fact are then appended to each other rather than Ored to produce the index. The CCW index also provides an aid in query processing. It suffers from increased storage requirements and from the false drop problem.

Babb has proposed that a Content Addressable File Store (CAFS) be used to process queries. CAFS uses a hashing technique, hardware selection filtering, and single bit maps to record intermediate results to aid in the join and projection operations. The CAFS system does not consider the processing of conjunctions involving joins on more than one variable nor the possible filtering that can be performed based on variable interactions.

SUMMARY OF THE INVENTION

It is an object of the invention to provide mechanisms to process conjunction-of-constraints queries which:
1) do not require additional indexes;
2) allow arbitrary query complexity without exponential explosion in query processing time; and
3) are inexpensive to implement.

It is a further object of the present invention to provide a Component Intersection ("CI") Database Filter to process conjunction-of-constraint queries.

It is another object of the invention to provide a Component Intersection Database Filter Engine which is capable of performing this processing.

For a wide variety of queries, this Component Intersection Database Filter Engine, or more simply Engine, drastically reduces the amount of processing required to determine the final answers. For certain queries it can eliminate all incorrect answers, thus requiring no further processing. It is of linear complexity. High speed filtering can be done with simple hardware. Further, the processing can be combined with conventional selection filtering and both performed in a pipelined fashion as data streams off disc. Since it requires that the facts be accessed by predicate name only, with no particular order among the facts of a predicate, it simplifies secondary file storage maintenance.

Component Intersection filtering can also speed the processing of fact-files resident in RAM by many orders of magnitude. The factor of improvement increases with file size. This is particularly the case when all answers are requested, as opposed to a request for just the first, or first few, answers.

Component intersection filtering is based on the discovery that if a particular unknown of a query appears in two or more constraints, then facts which contain terms corresponding to that unknown are not potential solutions where the term does not appear in each set of facts corresponding to the unknown as required by the constraints.

According to the invention, this discovery is utilized by building a filter organized by unknowns. The filter contains the possible terms for each unknown based on an intersection of the potential solution sets for those unknowns. The facts may then be processed to eliminate from further consideration any fact which contains a term which is not among the potential solution set for its corresponding unknown.

According to the invention, it is possible to eliminate from consideration many facts during the process of building the filter, thereby speeding the filter building process and greatly reducing any final filtering. This results from integrating the filter building and filtering tasks.

BRIEF DESCRIPTION OF THE DRAWINGS

FIGS. 2a-2c show an exemplary Subquery Q as a conjunction of constraints.

FIGS. 3a-3h show an example of the CI operations.

DETAILED DESCRIPTION OF THE PREFERRED EMBODIMENT

Define f-predicates to be predicates restricted to facts whose subjects have a fixed number of terms (fixed arity), each an individual constant. We assume the facts for each f-predicate are arranged as tuples in a file. For simplicity, the name of this file will be that of the f-predicate. This file may be located in secondary storage such as on a disc, or within the primary memory of a host processor. It is not required that the facts of a given f-predicate be stored in any particular order. When used within a host Logic programming language, the f-predicates may occur within the bodies of asserted rules, and be used as constraints in queries in the same manner as any other predicate.

Figure 1:
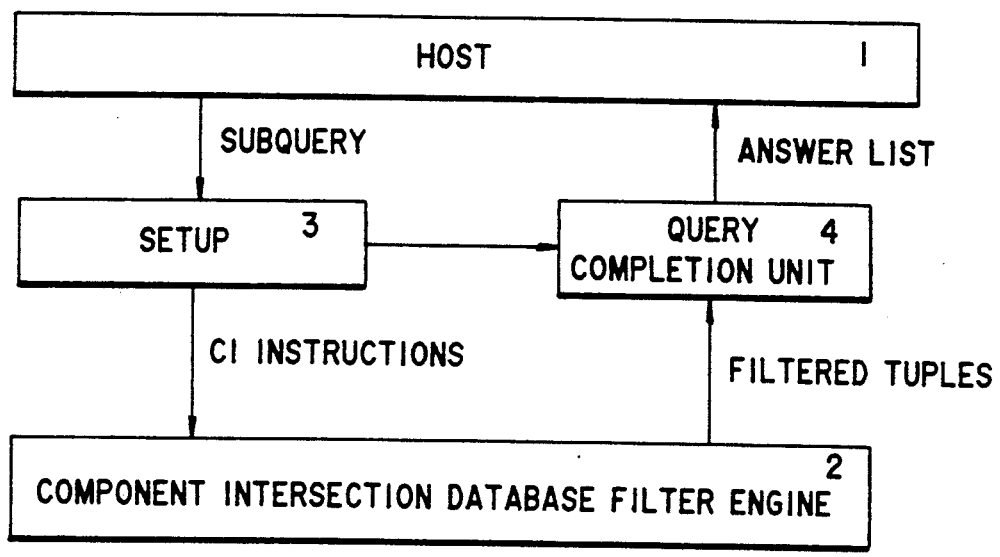
FIG. 1 shows a block diagram of the incorporation of the CI data base engine with a host processor.

Referring now to FIG. 1, the interaction between the host processor 1 and Component Intersection Database Filter Engine 2 is shown Within the total task of deducing answers to a query, the host identifies any f-predicates, and uses them to formulate a subquery in which the predicate of each constraint in the conjunction is an f-predicate. This subquery is forwarded to the Setup Unit 3 which analyzes the subquery and generates the appropriate instructions for the Engine and the Query Completion Unit (QCU) 4. The Engine 2 is responsible for filtering the f-predicates facts based on the instructions from the Setup Unit. The Engine 2 then returns the set of potential satisfaction sequences (defined below) for each f-predicate to the QCU The QCU extracts all answer tuples and submits these to the host. It is an object of the invention to effect the application of core Component Intersection processes, hereafter referred to as CI, in query processing regardless of how the segregation task, Setup unit, or post processor (QCU) is implemented.

It is assumed throughout that all subquery answers are to be found and returned. Requests specifying a single or fixed maximum number of answers are special cases of this. When a subquery has no answers, or fewer answers than requested, only an attempt to find all answers can determine that this is the case.

The Engine is based on a new CI filtering process. Its purpose is to generate the minimal number of potential satisfaction sequences for each f-predicate. To achieve this, non-answer f-predicate facts are removed based on the requirement that any instantiation of unknowns which leads to a valid answer must instantiate every occurrence of the same variable-name with the same value throughout the entire conjunction of constraints. Those not capable of meeting this requirement, even though they match some single constraint, can be eliminated from further consideration.

For certain types of queries, the CI filtering is able to produce exactly the set of all answers. In general, however, further processing of the potential satisfaction sequences is needed to form the answer tuples and to eliminate duplicate answers. This processing can be performed either by the QCU or the host. This invention is not limited to any particular means used to perform this post processing.

FIG. 2 shows an exemplary conjunction-of-constraints subquery as received by the Setup unit. For purposes of example, all f-predicates, or more simply predicates, will be denoted with Capital letters, all unknowns will be denoted by lower case letters, and all constant terms will be denoted by the capital letter K followed by a number. A conjunction of constraints may have any number of predicates and the same predicates may appear more than once. Any number of variables and constant terms are also permitted.

The subquery Q (FIG. 2a) asks for all instantiations of unknowns a, b, c, and d that are valid for the five constraints on the f-predicates M, N, P, R, and S. A star matrix, called a query pattern (FIG. 2b), gives a visual representation of the processing requirements of the conjunction of constraints. In the query pattern, the constants and the variables of the query are listed across the top of the matrix and label the columns of the matrix. The predicates are listed vertically in the left-hand column and label the rows. A * is placed in the variable and constant columns if they are contained in the query predicate for the row.

The Unknown Interaction (UI) pattern (FIG. 2c) gives a visual representation of the interaction between the unknowns of the query. The UI pattern is formed from the query pattern by including only the distinct unknowns, which are those unknowns appearing in more than one constraint (a c d e) or requested in the answer tuple (a b c d). The result (a b c d e) is called the sequence of unknowns. As with the query pattern, a * is placed in the variable and constant columns if they are contained in the query predicate for the row in the UI Pattern. In addition, the wild card # is used to denote unknowns on which the predicate constraint imposes no restrictions. In effect, any instantiation of a # sequence unknown is valid. The use of the # expands each of the predicates so that they have the same arity as the sequence of unknowns.

A query's satisfaction sequence is an instantiation of the sequence of unknowns which is valid for all of its constraints. There are two conditions which must hold for any satisfaction sequence. First, the satisfaction sequence must be a sequence instantiation for every individual predicate. (A sequence instantiation for an individual constraint predicate of a conjunction is valid for that predicate, but may or may not be valid for the remaining constraint predicates.) This is visualized by the horizontal rows of the UI pattern. Second, a term, or component, in a satisfaction sequence must be a matching component in the sequence instantiation of every constraint predicate. This is shown by the vertical columns of the UI pattern. The columns show the component interactions, i.e., that any valid satisfaction sequence term instantiation must appear in all terms in its column. The set of possible instantiations for a component of a satisfaction sequence can then be restricted to the intersection of the sets of instantiations for each predicate. This is the basis for the component intersection process and where it gets its name.

Although this invention is not restricted to any specific means used to perform selection filtering, the CI process performs best when combined with selection filtering. Selection filtering removes from consideration those facts not matching any of the constant terms in a constraint. In the case where an unknown appears more than once in a predicate constraint, this filtering would remove from consideration any facts of the predicate whose corresponding terms are not the same Selection filtering is also used to eliminate facts which contain terms which are out-of-range, e.g., greater than 1000, or do not meet other simple criteria. The selection processing can be done "enbatch" prior to the CI filtering stage, but may be more efficiently pipelined with the CI filtering stage.

CI Filtering

The Component Intersection operations are:

1. Given a conjunction of constraints, form a sequence of unknowns including all the distinct unknowns (more precisely of all distinct unknown-names) that occur in the conjunction. The order of listing is arbitrary. Let (x y z ... n) be such a sequence. A potential satisfaction sequence will be a n-tuple of constants whose first component is an instantiation of x, second component is an instantiation of y, etc.

2. Find all the sequence instantiations that satisfy the 1st constraint of the conjunction. This operation involves the constraint, the facts having the same predicate as the constraint, and the sequence of unknowns.

Let AA be the predicate of the 1st constraint. Each sequence instantiation is formed from one of the facts having predicate AA (and surviving any selection filtering). If unknown "x" occurs as the jth term of the constraint, then the jth term of the fact is the 1st component of the tuple (x, y, z ... n). Should the constraint AA not contain unknown "x," a "wild card" symbol, #, is used as the 1st component of the tuple (x, y, z ... n). The remaining unknowns y,z, etc. are similarly instantiated.

The original facts are no longer needed once the above tuples are formed, since for the purposes of the current query the information content of both is identical.

3. Form n sets, one per component of the sequence instantiations, the first set collecting all the unique constants occurring as 1st component of the sequence instantiations, etc. Those components containing a wild card # result in a set containing only the single wild card symbol. Let these sets be called AAx, AAy, AAz ...

4. Repeat 2 and 3 above for each of the remaining constraints BB, CC, ... of the conjunction.

5. Form the component intersection set for x, called CIx, from the Intersection of all the component sets AAx, BBx, CCx, ... Similarly form the component intersection sets CIy, CIz, ...

The intersection of AAx with BBx results in a set of constants that is smaller or equal to those in either AAx or BBx alone. Further intersection with CCx will (usually) reduce the set size further. Hence, the advantage of this invention increases with the number of constraints in a query.

Since the # stands for all possible instantiations, in forming the intersection any "wild card" sets can be ignored. Note that the number of sets intersected for a given component is equal to the number of constraints on the conjunction less the number of wild card sets for for that component.

Alternatively the intersection of the wild card set and an arbitrary set S can be defined to be the set S. The number of sets intersected is then equal to the number of constraints.

When all intersections are completed there are n sets, one for each component in the sequence of unknowns, i.e., one for each distinct unknown in the conjunction of constraints. For this query, the possible instantiations of unknown "x" are limited to those constants in CIx, the possible instantiations of "y" are limited to those constants in CIy, etc. If any CI set is empty, it is immediately established that the conjunction of constraints cannot be satisfied, i.e., there are no answers.

6. Filter the sequence instantiations for the AA constraint through the CI sets of step 5. Eliminate from further consideration those sequence instantiations whose first component is not in set CIx or whose 2nd component is not in CIy, etc. Pass only those sequences where the value of every component can be found in its corresponding CI set. The survivors are buffered for step 8 (optional) or for further processing by other stages of the system.

Equivalently, instead of buffering the survivors, one could simply mark the surviving tuples, or the tuples of the original facts from which the survivors were derived.

7. Repeat 6 for the sequence instantiations for remaining constraints BB, CC, ...

8. (Optional) Repeat Steps 3 through 7 on the buffered tuples, and on their survivors, etc. until no further elimination occurs.

For certain types of queries, the survivors of the selection and CI Filtering states are exactly the set of all answers. In general a query completion stage is required to determine which survivors are valid answers, and to eliminate duplicate answers. The invention is not restricted to any specific means to perform this query completion stage.

Referring to FIG. 3, a simple example of operations 1 through 7 is presented as an aid to understanding. The previously mentioned query Q2 is used as the example. The original PARENT and OWES predicate facts (FIGS. 3a and 3b respectively) are given along with the Q2 query (FIG. 3c). Next, FIG. 3d shows the result of non-CI filtering on the factbases Since the PARENT predicate appears in two constraints, it has been replicated and renamed PARENT1 and PARENT2. The only non-CI filtering in Q2 is as a result of the fourth constraint which states that the unknown "y" must be greater than or equal to 1000. The only other constraint in which y appears is OWES. As shown the OWES fact in which y is less than 1000 is eliminated from consideration. In a hardware implementation this non-CI filtering may be accomplished in a pipelined fashion with the CI filtering Advantageously, non-CI filtering is performed where a simple filter can be used to eliminate facts with a minimum processing expenditure. This is easily accomplished in the case of predicate facts containing numerical tuples which are out of range.

The sequence of unknowns of Q2 (w x y z) is given as a result of operation 1 (FIG. 3e). Operations 2 through 4 (FIG. 3f) produce the sequence instantiations for each of the predicates and their component sets for each of the sequence unknowns. In the PARENT1 constraint the sequence unknown w appears as the first term so the first term of the sequence instantiations will be the same as the first term of the predicate facts. Since x and y do not appear in PARENT1 the wild card # is used in these positions. The fourth term of these sequence instantiations is the second term of the original PARENT facts. Next to the sequence instantiations for PARENT1, the component sets for the sequence unknowns are given in the vertical listings with the name of the component sets below. The sequence instantiations for PARENT2 and OWES along with their component sets are also given.

The CI sets generated as a result of operation 5 are shown next (FIG. 3g). Again the component sets are listed vertically with their names below. The sets are a formed from the intersection of the component sets of all the constraint predicate facts For example CIw is the result of intersection PARENT1w, PARENT2w, and OWESw, or (John JohnJr. Ted Sue Mary Mark Michelle Kathy), (#), and (Mary Michelle), respectively. The result of this intersection is (Mary Michelle), which is CIw.

Each of the predicate sequence instantiations is then filtered through the CI sets (FIG. 3h). Only those sequence instantiations which have all of the terms their instantiations in their respective CI sets will pass the filtering (i.e., if any term of a sequence instantiation cannot be found in its respective CI set, that sequence instantiation may be removed from further consideration). As shown, only one fact in each of the three predicates remains after the filtering operation of steps 6 through 7. For example, the first, third, and fourth sequence instantiations for PARENT1 fail because their first term is not in CIw, while the second, sixth, seventh, and ninth ones fail due to both their first and fourth terms. The eighth one fails due to its fourth term alone. The fifth sequence instantiation is the only one which has all its terms in their CI sets. The results of filtering the PARENT2 and OWES predicates can be explained in a similar fashion.

There is no need for the optional Operation 8 since the facts at the end of Operation 7 filtering are exactly the answers required for query Q2. Refiltering will not produce any further reductions. If the factbases contained more data then refiltering might be useful.

According to the invention, the CI filter engine can be fully implemented by software in a general purpose programmable computer such as a micro computer. The filter engine can also be implemented in an add-on co-processor for a personal-type computer or be packaged with a peripheral storage device.

CI Database Filter Engine

FIG. 1 shows a block diagram of the incorporation of the CI Database Filter Engine with a host processor. The host is connected to the Setup Unit which in turn is connected both to the CI Database Filter Engine (Engine) and the Query Completion Unit (QCU). The Engine is connected to the QCU, which in turn is connected to the host. The Setup Unit and QCU could alternatively be incorporated in the host or in the Engine. The integration of the CI data base filter engine is not restricted to interfacing with only a single host. Multiple hosts could be connected to the Engine if a host arbitrator was provided to perform the traffic management necessary for multiple hosts. Furthermore, the Engine does not have to function as a back-end processor as depicted in the figure. The Engine could be fully integrated as a subpart of the host computer in which case there would not be the separate units.

Figure 4:
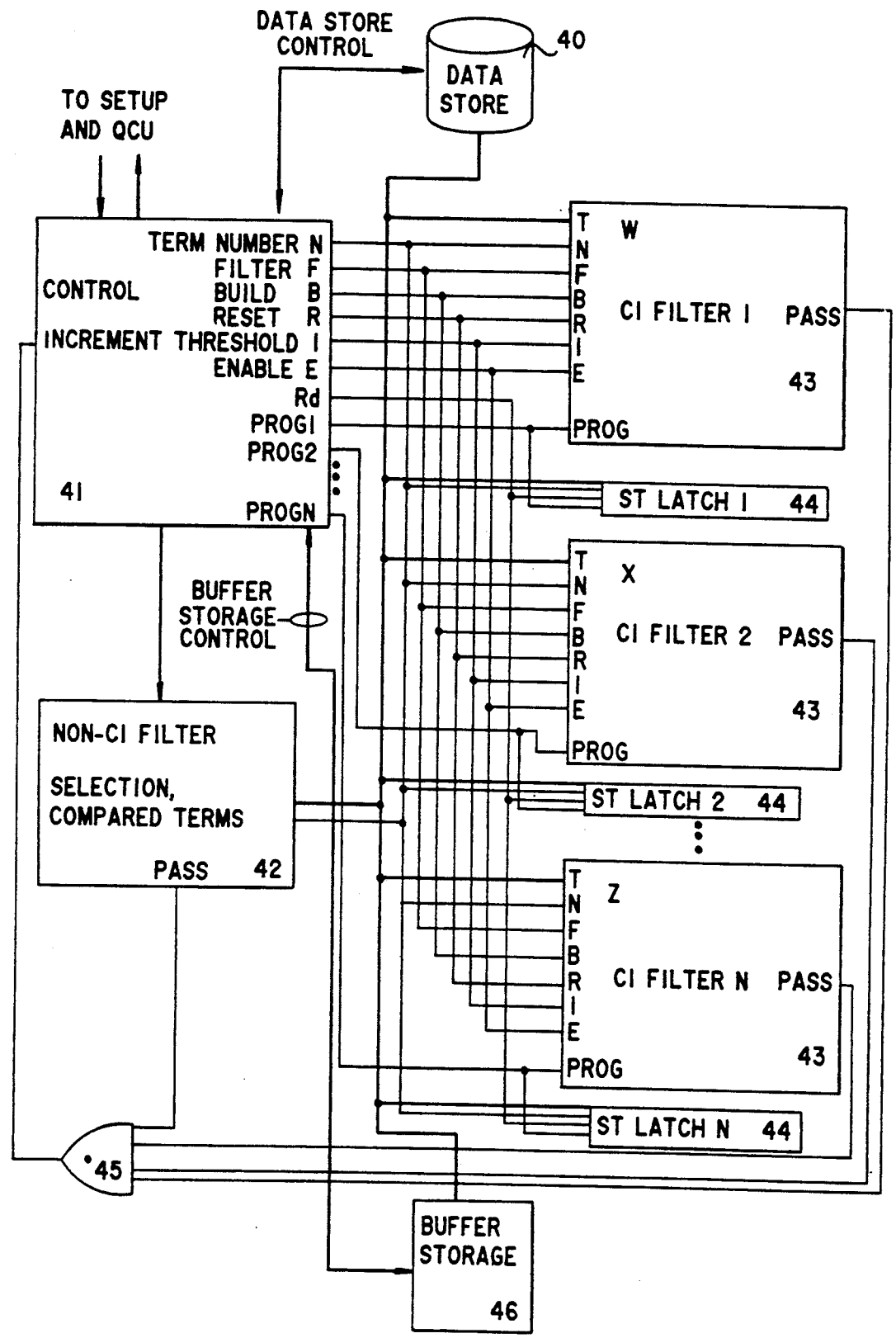
FIG. 4 shows the CI data base filter incorporated as a module within a database search engine.

The Engine, generally shown in FIG. 4, includes a storage unit 40 which contains the original Factbases, a Control Unit 41, a Non-CI Filter Unit 42, a plurality of CI Filters 43, a plurality of Selected Term (ST) latches 44, an And gate 45, and a buffer storage 46 for the potential satisfaction sequences that survive both the Non-CI and CI filtering. The storage unit containing the original factbases will be referred to as the storage unit and the buffer storage for the potential satisfaction sequences is called the buffer storage. The storage unit outputs each term of each fact to be processed to the Non-CI Filter Unit and CI Filters via a Term Bus that is p bit lines wide, where 0 to $2^p-1$ is the range of possible values for a given term. The factbase storage unit 40 may be secondary (such as a magnetic, optical, etc. disc), with such associated disc circuitry as is needed to read out the terms of the stored facts, one after another. For moderate size data bases the facts may reside totally in RAM or primary storage. The buffer storage 46 for the potential satisfaction sequences, which are normally much fewer than the original facts, would typically be RAM, although provisions to handle overloads via transfer to secondary media are not precluded.

The Non-CI filter contains such circuitry as is needed for selection filtering, including selecting only those facts where a constraint requires certain terms be equal. Means of accomplishing such selection filtering are well known. For a sequence of unknowns $(x, y, z, \ldots, N)$ the first CI filter applies to the intersection sets for x, the 2nd to the intersection sets for y, etc. Similarly, the first ST latch stores the fact term that instantiates x, the 2nd that instantiates y, etc. The And gate generates an overall pass signal signifying to the control unit that a fact has not been rejected by the Non-CI filter, nor by any of the CI-filter units.

Figure 5:
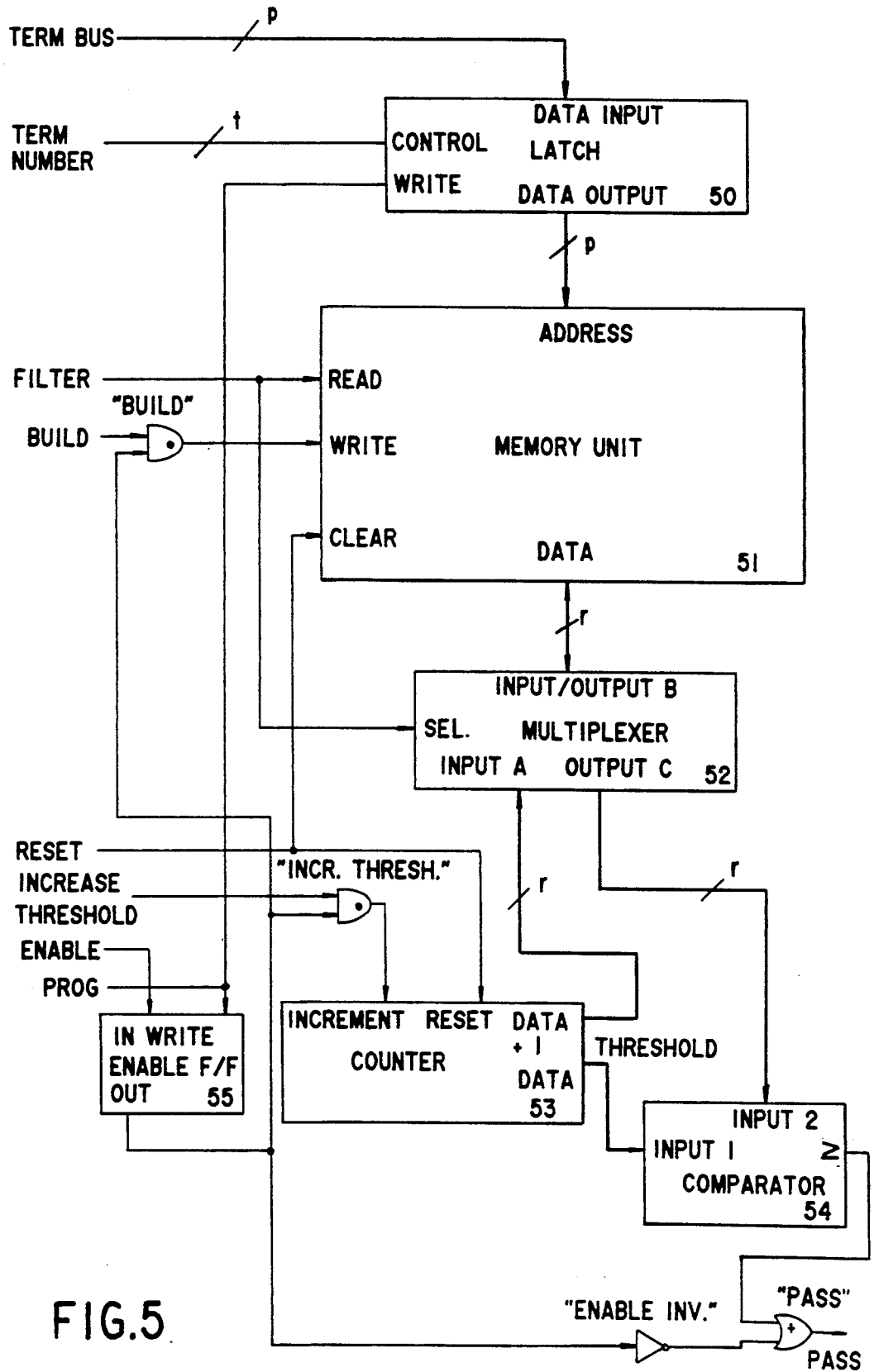
FIG. 5 shows a block diagram of the CI filter.

Referring now to FIG. 5, one of the plurality of CI filters is shown. It includes a programmable latch 50, a memory unit 51, a multiplexor 52, a counter 53 and a comparator 54, an enable flip-flop 55, and four logic gates. The latch 50 is programmed by the control unit 41 to latch a particular term from a given fact. The memory unit 51 has has p address lines, again where 0 to $2^p-1$ is the range of possible values for a given term. The memory word size is r bits, where $2^r-1$ is the maximum number of constraints that any unknowns may appear in for a single query. The memory has control inputs for read, write, and clear all bits to 0. The latched term addresses the memory while the multiplexor, counter, comparator, enable flip-flop, and logic gates control the reading and writing of the memory and the state of the Pass output.

CI Database Filter Engine Operation

The detailed operation of the CI database filter engine is described. The Setup Unit breaks the conjunction-of-constraints subquery from the host into detailed instructions for the Engine. Referring to FIG. 4, these instructions are carried out via high/low signals output from the Control Unit to each of the CI filters. They are passed via common single bit lines Reset (R), Build (B), Filter (F), Increase threshold (I), Enable (E), and a t-bit line where $2^t-1$ encodes the term number (N) from 1 to the maximum number of terms allowed in a fact. Individual program (Prog$_i$) signals are output by the control unit for each of the CI Filters, where subscript i is the number of the CI Filter. The Control unit 41 can also output signals to program the Non-CI Filter 42 (not described), and to control the storage unit. These controls are such that the unit can be commanded to find the first term of the first fact of a specified predicate, and to thereafter on cue read or write the first term, the second term, etc. of the first fact, repeating this for each fact of the specified predicate. All data access to the unit is through the Term bus, which can be read by the Non-CI Filter 42, the CI filters 43, and ST latches 44. The pass output (P) of each of the CI filters and of the Non-CI filter unit are inputs to the And gate 45. The output of this And gate is the pass fact signal which is routed to the Control unit.

Query processing is grouped in three hierarchies each successive one being under the preceding: the fact predicate, single facts, and individual terms. Regardless of the conjunction of constraints, all processing in the CI Database Filter Engine has the same general flow which is managed by the Control unit.

In the discussion of this operation, unless otherwise stated, all control signals are assumed to be low, or zero. Prior to processing the query, a reset signal is momentarily set high then low. For each CI filter this clears (sets to zero) its Memory Unit and resets its Counter.

Prior to processing the first constraint, each ST programmable latch and the programmable latch in each CI unit is disabled by setting each to latch term 0. (Actual fact terms are 1, 2, 3, etc.) Further, for each CI Filter 43, the Enable flip-flop 55 is programmed low to disable the filter. Disabling the filter inhibits writing of its Memory Unit, inhibits incrementing of the threshold counter, and fixes the pass output high. This is done by setting the Term number bus (N) to 0, the Enable line to 0, and issuing the program signal, Progi, to all filters. Following this, each CI filter that is to be used is individually programmed for the correct term number of the facts whose predicate matches the constraint. For instance, if the second term of the constraint is unknown x, then the latch 50 of the first CI filter, which has been assigned to build and test the CI Set for x, will be programmed to read the second term, as will its mate ST latch. Also, the Enable flip-flop for these units is set high to indicate that it is enabled. To achieve this programming, the term number is placed on the term number lines, the Enable signal is set high and the Program signal for the selected CI filter is momentarily set high. All the CI filters which have unknowns in the constraint are similarly programmed.

The Control unit also programs the Non-CI Filter Unit so that it will perform the proper filtering (Compared terms, selection, etc. ) as specified in the first constraint.

The Control unit signals to both the source and destination storage units which predicate is to be processed by placing its name, or number, on the predicate name bus. It then signals to the storage units that processing of this predicate is to begin by setting the new predicate line. The storage unit then places the first term of the first fact in the requested predicate on the term bus. This term is then ready to be processed.

The Control unit outputs a 1 on the Term number lines, indicating that the first term of the predicate is on the Term Bus. This causes the ST latch and CI filters latch which have been programmed for the first term to latch, or read, the Term Bus value into their registers. The term number lines are then returned to zero. A next term signal is then sent to the storage unit and a momentary 2 placed on the Term number lines. This continues until all terms of the fact have been latched, whereupon the Filter line is activated high. This causes the Non-CI Filter to perform its programmed tests and causes each of the enabled CI filters to determine if its latched term is in its CI set (for the first constraint this will always be the case). By design, all disabled CI filters have a high pass output since they are testing for the membership of the wild card in their CI sets. Each unit signals passage via a high on its Pass line. These lines are And-ed together and passed back to the control unit and to each CI filter as the pass fact signal. This pass fact signal will be high if all of the tests for the tuple were met.

If a fact passes, the Control Unit initiates two actions. It momentarily sets the Build line high. This causes each enabled CI Filter to add to the membership of its CI Set the value that was latched in its CI latch. Secondly the Control unit stores the potential satisfaction sequence for the constraint in the buffer storage. The control unit sets the read signal high and momentarily gives the term number of the first ST latch to be read into the buffer. The appropriately programmed latch will then put the value stored in it register on the term bus. The control unit will then issue the write term command to the buffer storage and the term will be written to the buffer. The remaining terms of the fact will be stored in a similar fashion. The wild card terms may either be written as some dummy value or not stored at all.

The successive facts of the first constraint are then considered in the same fashion as above until all facts of the first constraint have been processed. When this is done, the control unit sets the Increase threshold line high. This line is connected to all CI filters and causes each enabled filter to increase its threshold by 1 for the CI set membership test. After the first constraint this threshold is set from 0 to 1.

The facts corresponding to the second constraint will then be processed in the same manner as for the first constraint, beginning with the disabling of all CI-Filters. The (re)programming enables those CI filters corresponding to the unknowns of the 2nd constraint, and programs each CI latch and matching ST latch to latch the appropriate fact term. Again when all facts have been processed, the controller sets the Increase threshold line high. The threshold will be set from 1 to 2 for those CI filters whose assigned unknown was in both constraints, and from 0 to 1 for those CI filters whose assigned unknown was only in the 2nd constraint. The threshold will remain 1 for those CI filters whose unknowns were in the first constraint but not the second and will still be 0 for any CI filters whose unknown does not occur in either of the first two constraints. This will be repeated until all constraints have been processed once. If the same predicate occurs in more than one constraint, then the potential satisfaction sequences for the two, or more, constraints will be saved separately with distinguishable names.

After all the constraints have had their facts processed once, the buffered potential satisfaction sequences are refiltered once or more times through the CI Sets. The refiltering proceeds in the same fashion as the original filtering except that the surviving potential satisfaction sequences now serve as the source facts rather than the original facts. Also, the Non-CI filter plays no role in refiltering and always has a high pass output. The potential satisfaction sequences surviving the first refiltering will be saved in the storage unit. In any further refiltering, the source and destination roles of the two storage units will alternate.

CI FILTER OPERATION

The detailed operation of a individual CI Filter is described. Each CI Filter is designed to build a single CI set and to filter terms through that set. Referring now to FIG. 5, the CI filter is shown. The programmable latch 50 latches fact term values from the Term Bus (T). It can be programmed to latch for a given value of the Term number (N) lines by applying that number to the term number lines and momentarily setting the Program (Progi) line high for that CI Filter. The latched value read from term bus is output to the memory units address lines. Previously described, the memory unit has $2^p$ r-bit words. The memory has inputs read, clear, and write connected, respectively, to signals Filter (F), Reset (R), and to the output of the Build And gate. The Build And gate has as inputs Build and the output of the Enable flip-flop. The data lines of the memory unit are connected to a Multiplexer which takes as its selector control the Filter signal. The first mode of the multiplexer is selected when filter is low and passes the Data+1 output of the Counter to the memory's data lines. The second mode is selected when filter is high and passes data from the memory's data lines to Input2 of the greater than or equal to comparator. The Counter has two input signals: one the Reset (R) signal, and the other from the output of the Increment AND gate. The Data output of the counter is connected to the First input of the comparator. The Increment And gate has one input connected to the Increase Threshold (1) control line and the other to the output of the Enable register. The Enable register has inputs Enable and Program (Progi) Its output is connected to the "Build" And gate, the "Increment" And gate and the Enable Inverter. The output of the comparator and the output of the Enable inverter are connected to the "Pass" Or gate whose output is the Pass signal.

A CI Filter unit is reset by setting the Reset signal high. Resetting clears the CI filters memory, setting all words to zero. It also sets the counter's Data output to zero and its Data+1 output to 1. The combination of the counter and the memory is the means by which it is determined if a given term can be excluded as a viable instantiation for a satisfaction sequence. If the term is excluded, the fact of which it is a term is also excluded and none of its other term values are allowed to build their respective CI sets. Resetting places the CI filter in its initial where no term instantiation is excluded.

A term is said to correspond to a memory location if the integer used to represent the term is the location address. This imposes a mapping from the factbase terms to the set of integers. The mapping must be a function, i.e., it must always map a term to a single integer. It does not have to be one-to-one, i.e., map a term to a unique integer. However, if it is, the CI filter will be a more potent filter.

A term instantiation is included in its CI set if the memory location corresponding to the instantiation contains a value which equals or exceeds the threshold value. The threshold value is read at the Data output of the Counter. This is the condition which is tested when the filter signal is issued to the CI filter. For an enabled CI filter, the pass output will be set high only if the address corresponding to the instantiation contains a value which equals or exceeds the threshold value. Each disabled CI filter always has a high pass output.

After all terms of a fact have been read, the fact passes if all CI filters have a high pass output and the Non-CI filter has a high pass output. When a fact passes, the control unit issues the build signal. The build signal indicates to each enabled filter that it should add its latched value, i.e., the current instantiation, to the next CI set. The next CI set is that which will be used for the filtering of the facts corresponding to the next constraint. Before programming for the next constraint, the current threshold will be raised by one. This is the reason for having both the Data and the Data+1 outputs of the counter. The Data output is used in filtering for the testing for membership in the current CI set, while the Data+1 output is used to build those values that should be included in the next CI set. The Build signal is And-ed with the Enable register and connected to the write input of the memory. If the CI filter is enabled and the build signal is issued, the Data+1 output of the counter is written to the memory at the location stored in the latch. The location to which it will be written will be the one corresponding to the instantiation to be included in the next CI set.

As previously described, the first step in programming for a new constraint is to disable all the CI filters. A CI-Filter unit is disabled by setting the Term number lines to 0, the Enable line to 0 and pulsing the unit's Program line high. This both programs the latch to latch on term number 0, and sets the Enable flip-flop to disable writing of the memory Term number 0 is the value used when the CI filter does not participate in the processing since no predicate has a term numbered 0, only terms numbered 1, 2, 3 up to the maximum number, $2^t - 1$ allowed by the design.

Those CI Filters assigned to an unknown of the current constraint are then enabled and programmed to latch the appropriate term number. If a CI Filter is assigned an unknown which is not a term in the current constraint, it will remain disabled and its memory and counter will not change during the processing of the constraint. Also, its threshold will not be increased.

The programming of a CI filter is achieved by specifying the number of the term where the relevant unknown is found in the constraint predicate. This term number is then placed on the Term number lines. The Enable line is also set high. The Program control line for this and only this CI Filter is then momentarily raised high. This sets the Enable flip-flop high to allow memory writing, counter incrementing, and the pass output to depend on the CI set compare. It also programs the latch in the CI filter so that whenever the programmed term number appears on the term number (N) lines, the value on the term bus lines will be read into the latch. After all of the relevant CI filters have been programmed, the predicate filtering begins. A term of a fact is placed on the Term bus. The term number is then placed on the Term number lines. This is accomplished in a stream fashion and is repeated for every term in the fact. A filter which has been programmed for a given term number will latch the Term bus value when that term number appears.

Once all terms of a fact have been streamed, the Filter signal is issued. The memory is read at the location specified by the output of the latch since the latch Output is connected to the Address lines of the memory. The Filter signal is also the Control input to the multiplexer and, when high, connects the data Output of the memory to the Input 2 of the comparator. The Input 1 of the comparator is connected to the Data, or threshold, output of the counter. If this memory value is equal to or greater than the threshold value, then the term is in the CI Set and passes the CI filtering on this variable, and hence the comparator Output will be high. The Output of the comparator is connected to the first input of the Or gate and when it is high, the Pass OR gate output will be high.

For any disabled CI filters, the Output of the Pass Or gate will also be high Disabled CI filters serve the wild card function mentioned above in the CI operation description. The Enable Output is connected to an Inverter whose output is connected to the second input of the Pass OR gate. Therefore, the only time the Pass output will not be high is when the CI filter is Enabled and the latch addressed memory location value is less than the threshold. This is equivalent to saying that this instantiation is not in the CI Set.

Referring to FIG. 4, the output of each pass filter is AND-ed with the results of the other CI filters and the Non-CI filter to generate a fact pass signal for the fact that was just filtered. For any fact, the Pass And gate 45 will be high only when every CI filter 43 passes and the Non-CI filter 42 passes. When a fact passes, the control unit sets the filter signal low, and the build signal high. If a fact does not pass, the Filter line will be set low and the next fact will be filtered.

Referring now to FIG. 5, the build signal is And-ed with the Enable flip-flop to generate the Write input to the memory. This Write input will be high when both inputs are high, i.e., when the CI filter is enabled and the build signal is present. Since the Filter signal is low, the multiplexer will connect the data lines of the memory to the counter's Data+1 output. Also, the integer corresponding to the instantiation of the CI term is still on the latch output, so the memory is addressed at the location of the instantiation which should be included in the next CI set. When the build signal is presented, the enabled CI filter will include their current instantiation in the next CI set by writing Data+1 to the addressed memory location. It is possible that the instantiation has already been included, for some previous fact, in the CI set before the build signal is presented. This does not pose a problem since the Data+1 threshold will just be rewritten over the previous (and, in this case, identical) contents of the location.

Once all facts of a constraint predicate have been filtered, the threshold of the enabled CI Filters is increased by one. This indicates that the threshold is now set for the next CI set. The current threshold is the Data output of the counter. The Increase threshold signal is And-ed with the enable flip-flop to generate the counters Increment input. The And-ing of the Increase threshold signal with the enable flip flop insures that only enabled CI filters will increase their thresholds. The counter will increase both its Data and Data+1 registers when it receives the Increment signal. For example, if a CI Filter is enabled for the initial processing of the first query constraint, the Data and Data+1 registers will go from being 0 and 1, respectively, before the increment to 1 and 2, respectively, afterward.

The embodiments described herein are given by way of example and are illustrative of the invention. The description of the preferred embodiments is not intended to limit the scope of the invention which is defined by the claims.

What we claim is:

1. A factbase filter engine comprising:
   means for storing a factbase organized as a plurality of predications, each containing one or more facts each with one or more terms;
   a control unit responsive to query parameters connected to said means for storing;
   a plurality of component term intersection filters, each containing at least
     a random access memory connected to said means for storing and said control unit wherein addressable locations of said memory correspond to terms of said facts,
     means for evaluating contents of an addressable location of said memory connected to said memory and said control unit, and
     means for writing into said memory connected to said control unit, said means for evaluating and said memory; and
   a buffer store connected to said means for storing and said control unit.

2. A factbase filter engine according to claim 1, wherein said means for writing is responsive to said means for evaluating of all of said component term intersection filters.

3. A factbase filter engine according to claim 2, further comprising a selection filter connected to said means for storing, said control unit and said means for writing of each component term intersection filter.

4. A factbase filter engine according to claim 3, wherein said means for evaluating comprises means for comparing said contents to a threshold level.

5. A factbase filter engine according to claim 4, wherein said means for writing comprises means for writing an incremented threshold into said memory.

6. A factbase filter engine according to claim 3, further comprising a term latch associated with each component term intersection filter connected to said means for storing and said control unit.

7. A factbase filter engine comprising:
   means for storing a factbase organized as a plurality of predications, each containing one or more facts each with one or more terms;
   control means responsive to a conjunction of constraints for delivering facts from said means for storing;
   a component intersection filter means connected to said means for storing and said control means for eliminating from further consideration facts which contain terms which are not within a component intersection set defined by an intersection of instantiations of corresponding terms of said predications wherein said corresponding terms are defined by a predetermined conjunction of constraints.

8. A filter engine according to claim 7, wherein said component intersection filter means further comprises a plurality of term filters, each corresponding to an unknown contained in two or more of said constraints.

9. A filter engine according to claim 8, wherein each term filter comprises a memory with index storage locations corresponding to a term of said facts delivered from said means for storing;
   means for writing into said index storage locations an indication when a term is within said component intersection set, wherein said indication is an incremented index and said component intersection set is further defined by a term level index;
   means for indicating facts which contain only terms which are members of said intersection connected to said index storage location and said control means.

10. A filter engine according to claim 8, wherein each term filter comprises a memory with index storage locations corresponding to a term of said facts delivered from said means for storing;
    means for writing into said index storage location when a term is a member of a fact which contains only terms which are within associated component intersection sets, wherein said indication is an incremented index and said intersection sets are further defined by a term index level; and
    means for indicating facts which contain only terms which are members of said intersection connected to said index storage location and said control means.

11. A filter engine according to claim 10, wherein said means for indicating is a secondary storage unit.

12. A filter engine according to claim 9, wherein said means for indicating is a secondary storage unit.

13. A factbase filter engine comprising:
- a control unit connected to a factbase storage unit;
- a plurality of component intersection filters each corresponding to a constraint conjunction unknown, responsive to said control unit and connected to said factbase storage unit; and
- a secondary storage unit responsive to said component intersection filters and said control unit.

14. A filter engine according to claim 13, wherein said factbase storage unit and said secondary storage unit are portions of a single storage device.

15. A filter engine according to claim 13, wherein each component intersection filter further comprises a random access memory addressed by term of said factbase.

16. A filter engine according to claim 13, further comprising a selection filter responsive to said control unit and connected to said factbase storage unit.

17. A filter engine according to claim 16, wherein each of said component intersection filters and said selection filter include an indication output connected to said control unit.

18. A filter engine according to claim 13, wherein each of said component intersection filters includes an indication output connected to said control unit.

19. A method for filtering a factbase in response to a query made up of a conjunction of two or more constraints comprising the steps of:
- constructing a filter containing component intersection sets by intersecting instantiations of corresponding terms of predicates of said constraints;
- filtering facts of said predicates by eliminating from consideration all facts which include any term which is not within a corresponding component intersection set of said filter.

20. A method according to claim 19, wherein said step of constructing further comprises:
- forming a sequence of unknowns of said constraints;
- generating a potential satisfaction sequence for each term of said facts corresponding to said unknowns for each predication;
- intersecting corresponding fact terms of said potential satisfaction sequences wherein said intersection defines a component intersection set for each unknown.

21. A method according to claim 20, further comprising the step of:
- reducing said potential satisfaction sequences to component sets wherein each component set contains only unique elements, and
- wherein said step of intersecting intersects corresponding component sets.

22. A method according to claim 20, further comprising the steps of:
- repeating said steps of constructing and filtering using only facts of said predicates not eliminated during a previous filtering step.

23. A method according to claim 22, wherein said step of repeating is continued until no additional facts are eliminated.

24. A method according to claim 19, further comprising the step of selection filtering said factbase.

25. A factbase filter engine comprising:
- means for storing a factbase organized as a plurality of predications, each containing one or more facts each with one or more terms;
- control means responsive to a conjunction of constraints for delivering facts from said means for storing;
- a component intersection filter connected to said means for storing and said control means.

26. A filter engine according to claim 25, wherein said component intersection filter is configured to eliminate from further consideration facts which contain terms which are not within a component intersection set defined by an intersection of instantiations of corresponding terms of said predications wherein said corresponding terms are defined by a predetermined conjunction of constraints.

* * * * *